Feb. 19, 1952 J. P. LEWIS ET AL 2,586,236
LAWN MOWER SHARPENER
Filed Nov. 25, 1949 2 SHEETS—SHEET 1

James P. Lewis
Ralph R. Rader
INVENTORS.

BY *Clarence A. O'Brien
and Harvey B. Jacobson*
Attorneys

Feb. 19, 1952　　J. P. LEWIS ET AL　　2,586,236
LAWN MOWER SHARPENER

Filed Nov. 25, 1949　　2 SHEETS—SHEET 2

James P. Lewis
Ralph R. Rader
INVENTORS.

BY *Clarence A. O'Brien*
*and Harvey B. Jacobson*
Attorneys

Patented Feb. 19, 1952

2,586,236

UNITED STATES PATENT OFFICE 2,586,236

LAWN MOWER SHARPENER

James P. Lewis and Ralph R. Rader, Howard, Kans.

Application November 25, 1949, Serial No. 129,394

5 Claims. (Cl. 51—173)

This invention relates to new and useful improvements and structural refinements in sharpeners for lawn mowers, and the principal object of the invention is to provide a portable sharpener of the character herein described, whereby the blades on the cutter reel of a lawn mower may be quickly, easily and efficiently sharpened.

This object is achieved by the provision of a flexible drive shaft carrying a rotatable grinding wheel disposed in a relatively stationary frame, an important feature of the invention residing in the provision of guide means which are slidably engageable with the usual stationary cutter blade and with one of the blades of the cutter reel of a lawn mower, whereby the periphery of the grinding wheel is engaged in a predetermined, proper relation with the blade of the reel for the purpose of efficiently and easily sharpening the same.

Some of the advantages of the invention reside in its simplicity of construction, in its adaptability for use on lawn mowers of different sizes and types, and in its adaptability to economical manufacture.

With the above more important objects and features in view, and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
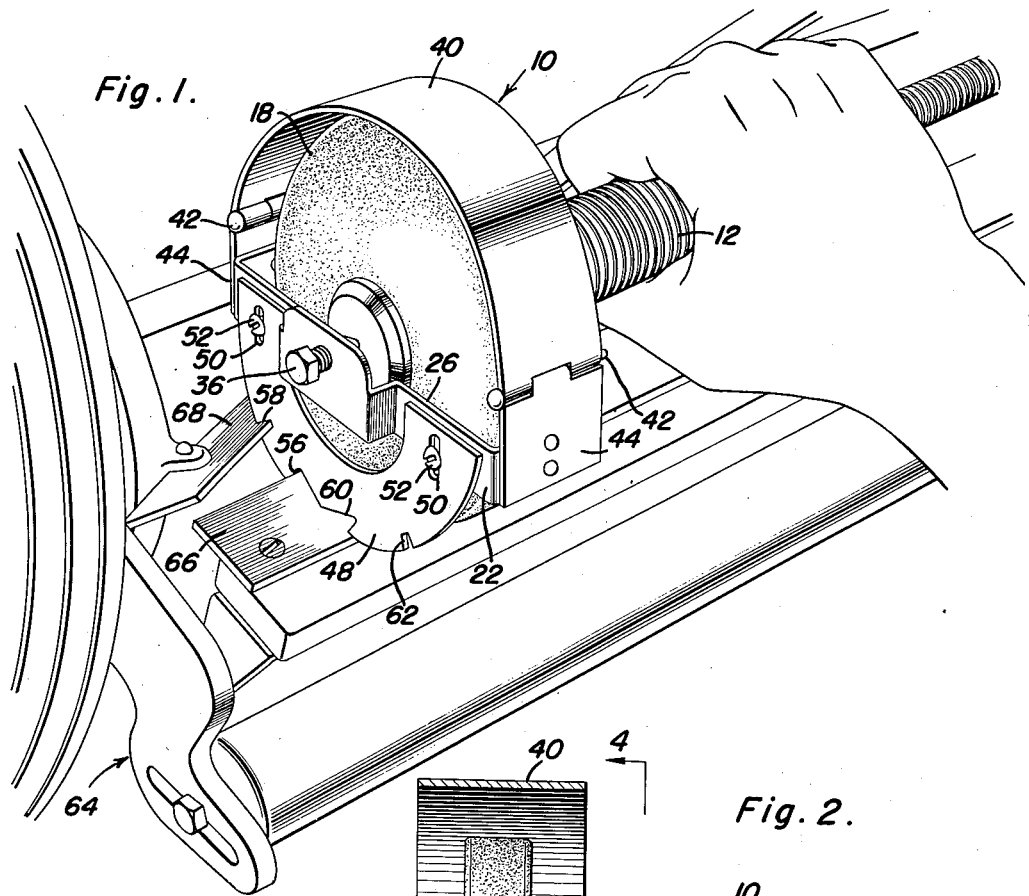
Figure 1 is a perspective view of the invention in use.

Referring now to the accompanying drawings in detail, the invention consists of a lawn mower sharpener designated generally by the reference character 10, the same embodying in its construction a flexible, tubular casing 12 containing a rotatable, flexible drive shaft 14 which projects outwardly from a terminal cap or bushing 16 at the end of the casing 12 and carries on its projecting end portion a conventional grinding wheel 18, secured to the shaft by suitable locknuts 20.

The casing 12 supports a substantially rectangular frame 22 which includes a pair of spaced side members 24, 26, the latter being provided with a substantially semi-circular clamp portion 28 while a complemental clamp portion 30 is hinged at one side of the clamp portion 28 as at 32 and a suitable clamping screw is employed for drawing the clamp portions together and around the terminal cap 16 of the casing 12, whereby the entire frame 22 is securely but removably mounted on the casing.

Figure 2:
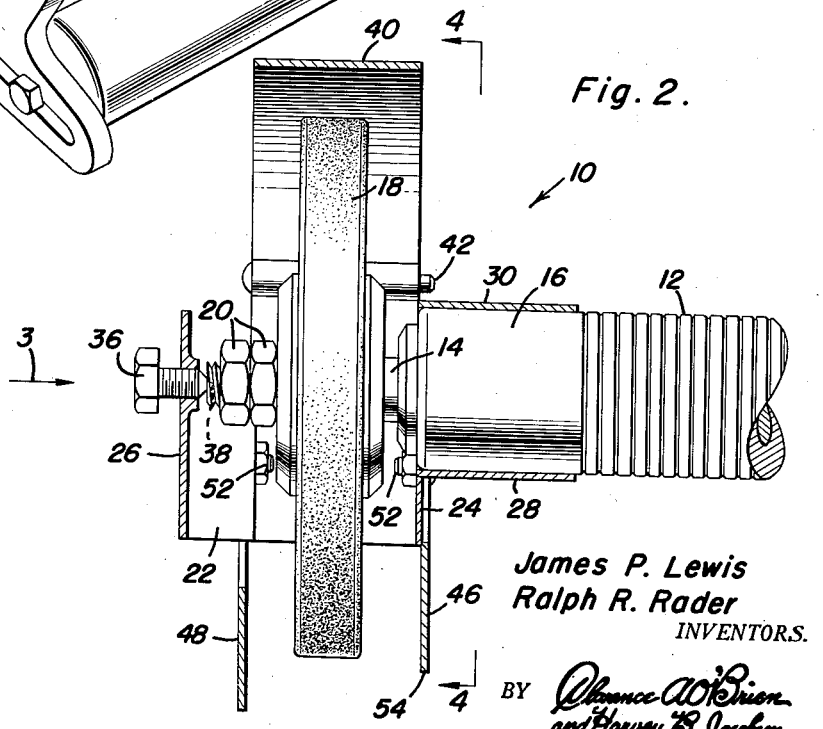
Figure 2 is a fragmentary sectional view of the invention per se, this view being taken substantially in the plane of the line 2—2 in Figure 3.

If desired, a bearing screw 36, having a conical end at the shank thereof, may extend into a counterbore 38 (see Figure 2) provided in the projecting end of the shaft 14, thus affording a bearing for the projecting end of the shaft at a point adjacent the side member 26 in which the screw 36 is located.

An arcuated guard or shield 40 may extend above the upper portion of the wheel 18 as a component of the frame 22 to which the shield 40 may be hingedly or removably attached by hinge pin 42 and brackets 44, as shown, and the hinged mounting or removability of the shield or guard will, of course, facilitate removal of the frame 22 from the casing 12 when so desired.

Figure 3:
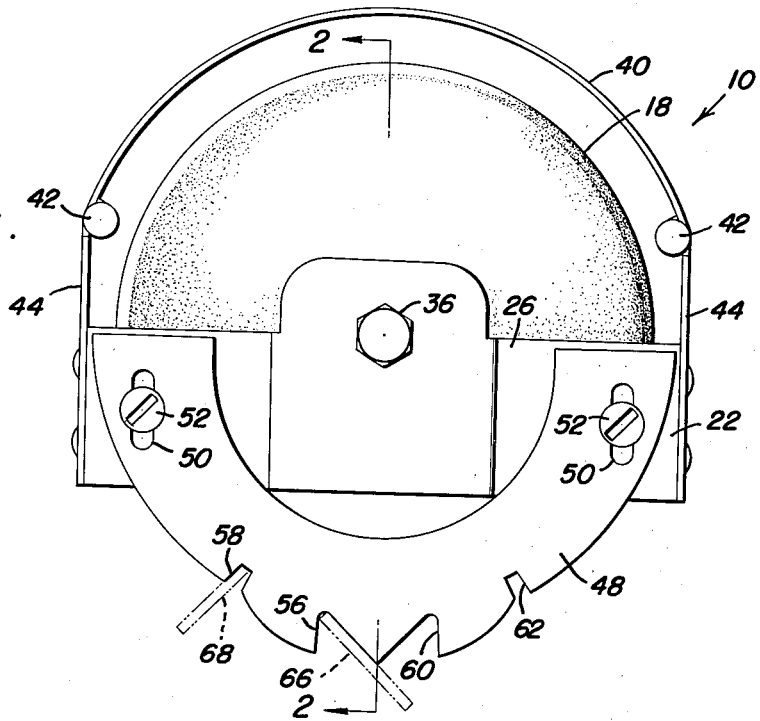
Figure 3 is an end view of the invention, taken in the direction in the arrow 3 in Figure 2.
Figure 4:
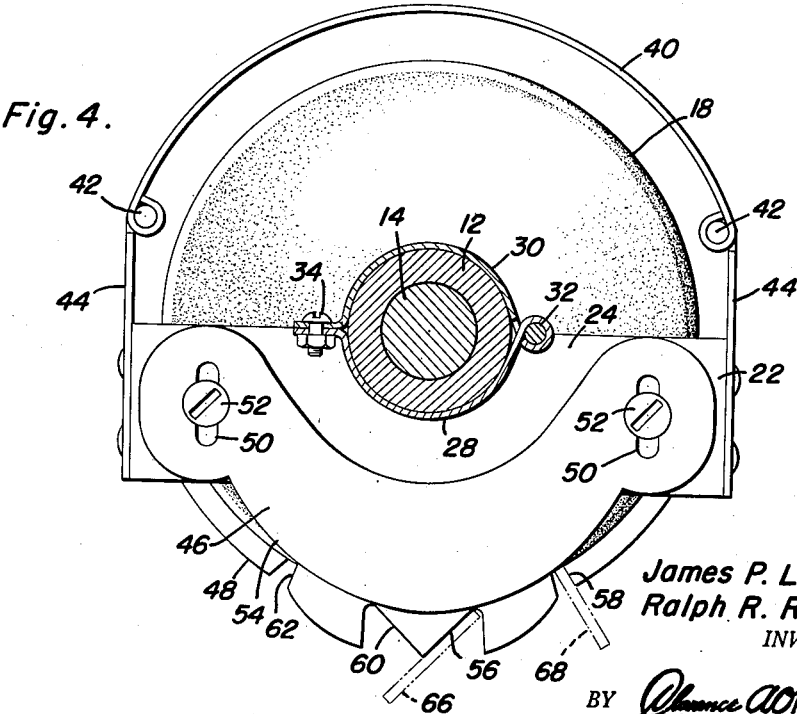
Figure 4 is a cross-sectional view, taken substantially in the plane of the line 4—4 in Figure 2.

A pair of arcuated guiding plates 46, 48 are adjustably attached to the respective side members 24, 26, this being achieved by providing end portions of the guiding plates with slots 50 to accommodate suitable fastening bolts or screws 52 extending through the side members 24, 26, as is best illustrated in Figures 1, 3 and 4.

The lower edge 54 of the plate 46 is substantially arcuated while the lower edge portion of the plate 48 is provided with pairs of notches 56, 58 and 60, 62. These notches are configurated and disposed substantially as shown, so that when the invention is placed in use, a lawn mower 64 which is to be sharpened is inverted as shown in Figure 1 and the cutting edge portion of the usual stationary cutter blade 66 is inserted in the notch 56 while one of the blades 68 of the cutting reel is similarly inserted in the notch 58, as illustrated in Figure 1.

Thereupon, by simply holding the casing 12 as shown in Figure 1 and sliding the sharpener longitudinally on the stationary blade 66, the periphery of the rotating grinding wheel 18 will not only be maintained in a predetermined, angular relation to the cutting edge of the reel blade 68, but the disposition of the blade 68 in the notch 58 will cause the reel to be partly rotated by the sliding of the sharpener so that the entire length of the cutting edge of the blade 68 will be ground or sharpened by the wheel 18.

Proper adjustment in the relation between the periphery of the grinding wheel and the cutting edge of the blade 68 may be achieved by simply loosening the bolts 52 and varying the position of the guiding plates 46, 48 relative to the respective side members 24, 26, it being understood that when the sharpener is slid along the stationary blade 66, the latter blade as well as the cutting edge of the blade 68 are engaged by the arcuated edge 54 of the guiding plate 46 for additional guidance, over and above that facilitated by the notches 56, 58.

It is to be noted that the configuration and relationship of the notches 56, 58 is such as to accommodate reel blades 68 of the usual, spiral configuration, the purpose of the notches 56, 58 being to accommodate spiral blade of one hand, while the notches 60, 62 similarly accommodate spiral blades of the relatively opposite hand, depending, of course, on the type of the lawn mower which is to be sharpened.

It is believed that the advantages and use of the invention will be clearly apparent from the foregoing disclosure and accordingly, further description thereof at this point is deemed unnecessary.

Having described the invention, what is claimed as new is:

1. In a lawn mower sharpener, the combination of a flexible casing, a flexible drive shaft rotatable in and projecting outwardly from said casing, a substantially rectangular frame removably mounted at one end of said casing and having a projecting portion of said shaft extending therein, a bushing positioned at the end of the casing adjacent said frame and receiving said shaft for rotation therein, said bushing being clampingly held in said frame, a rotatable grinding wheel provided in said frame on said shaft, guide means on said frame at opposite sides of said wheel for slidably engaging a stationary cutter blade and a cutter reel blade of a lawn mower whereby the periphery of said grinding wheel may be engaged in predetermined relation to said reel blade and cutter blade, said guide means including a pair of guide plates secured to said frame at opposite sides of said grinding wheel, and means for adjusting the relation between said plates and said frame.

2. In a lawn mower sharpener, the combination of a flexible casing, a flexible drive shaft rotatable in and projecting outwardly from said casing, a substantially rectangular frame removably mounted at one end of said casing and having a projecting portion of said shaft extending therein, a bushing positioned at the end of the casing adjacent said frame and receiving said shaft for rotation therein, said bushing being clampingly held in said frame, a rotatable grinding wheel provided in said frame on said shaft, and guide means on said frame at opposite sides of said wheel for slidably engaging a stationary cutter blade and a cutter reel blade of a lawn mower whereby the periphery of said grinding wheel may be engaged in predetermined relation to said reel blade and cutter blade, said guide means including a pair of guide plates secured to the side members of said frame at the relatively opposite sides of said grinding wheel, at least one of said plates being provided with notches to slidably receive the stationary cutter blade and the reel blade for sharpening the same.

3. In a lawn mower sharpener, the combination of a flexible casing, a flexible drive shaft rotatable in and projecting outwardly from said casing, a substantially rectangular frame removably mounted at one end of said casing and having a projecting portion of said shaft extending therein, a bushing positioned at the end of the casing adjacent said frame and receiving said shaft for rotation therein, said bushing being clampingly held in said frame, a rotatable grinding wheel provided in said frame on said shaft, and guide means on said frame at opposite sides of said wheel for slidably engaging a stationary cutter blade and a cutter reel blade of a lawn mower whereby the periphery of said grinding wheel may be engaged in predetermined relation to said reel blade and cutter blade, said guide means including a pair of guide plates secured to the side members of said frame at the relatively opposite sides of said grinding wheel, at least one of said plates being provided with notches to slidably receive the stationary cutter blade and the reel blade for sharpening the same, wherein at least one of said notches is substantially radially extending and adapted to receive the reel blade, and at least one other notch extending along an axis angularly positioned with respect to a radial element in the plate.

4. In a lawn mower sharpener, the combination of a flexible casing, a flexible drive shaft rotatable in and projecting outwardly from said casing, a substantially rectangular frame removably mounted at one end of said casing and having a projecting portion of said shaft extending therein, a bushing positioned at the end of the casing adjacent said frame and receiving said shaft for rotation therein, said bushing being clampingly held in said frame, a rotatable grinding wheel provided in said frame on said shaft, and guide means on said frame at opposite sides of said wheel for slidably engaging a stationary cutter blade and a cutter reel blade of a lawn mower whereby the periphery of said grinding wheel may be engaged in predetermined relation to said reel blade and cutter blade, said guide means including a pair of guide plates secured to the side members of said frame at the relatively opposite sides of said grinding wheel, at least one of said plates being provided with notches to slidably receive the stationary cutter blade and the reel blade for sharpening the same, and means for adjusting the relation between said plates and said side members of the frame.

5. In a lawn mower sharpener, the combination of a flexible casing, a flexible drive shaft rotatable in and projecting outwardly from said casing, a substantially rectangular frame removably mounted at one end of said casing and having a projecting portion of said shaft extending therein, a bushing positioned at the end of the casing adjacent said frame and receiving said shaft for rotation therein, said bushing being clampingly held in said frame, a rotatable grinding wheel provided in said frame on said shaft, and guide means on said frame at opposite sides of said wheel for slidably engaging a stationary cutter blade and a cutter reel blade of a lawn mower whereby the periphery of said grinding wheel may be engaged in predetermined relation to said reel blade and cutter blade, said guide means including a pair of guide plates secured to the side members of said frame at the relatively opposite sides of said grinding wheel, at least one of said plates being provided with notches to slidably receive the stationary cutter blade and the reel blade for sharpening the same, wherein at least one of said notches is substantially radially extending the adapted to receive the reel blade, and at least one other notch extending along an axis angularly positioned with respect to a radial element in the plate, and means for adjusting the relation between said plates and said side members of the frame.

JAMES P. LEWIS.
RALPH R. RADER.

REFERENCES CITED

The following references are of record in the file of this patent:

UNITED STATES PATENTS

| Number | Name | Date |
|---|---|---|
| 1,291,982 | Madsen | Jan. 21, 1919 |
| 1,398,906 | Madsen | Nov. 29, 1921 |
| 1,968,609 | Madsen | July 31, 1931 |
| 2,441,045 | Toepfer | May 4, 1943 |

FOREIGN PATENTS

| Number | Country | Date |
|---|---|---|
| 606,000 | Germany | Nov. 23, 1934 |